Oct. 3, 1967  F. M. ERNSBERGER  3,345,148
METHOD OF DRAWING A GLASS SHEET, A PORTION OF ITS
SURFACE BEING UNTOUCHED
Original Filed June 27, 1963  4 Sheets-Sheet 1

INVENTOR.
FRED M. ERNSBERGER
BY
Chisholm and Spencer
ATTORNEY

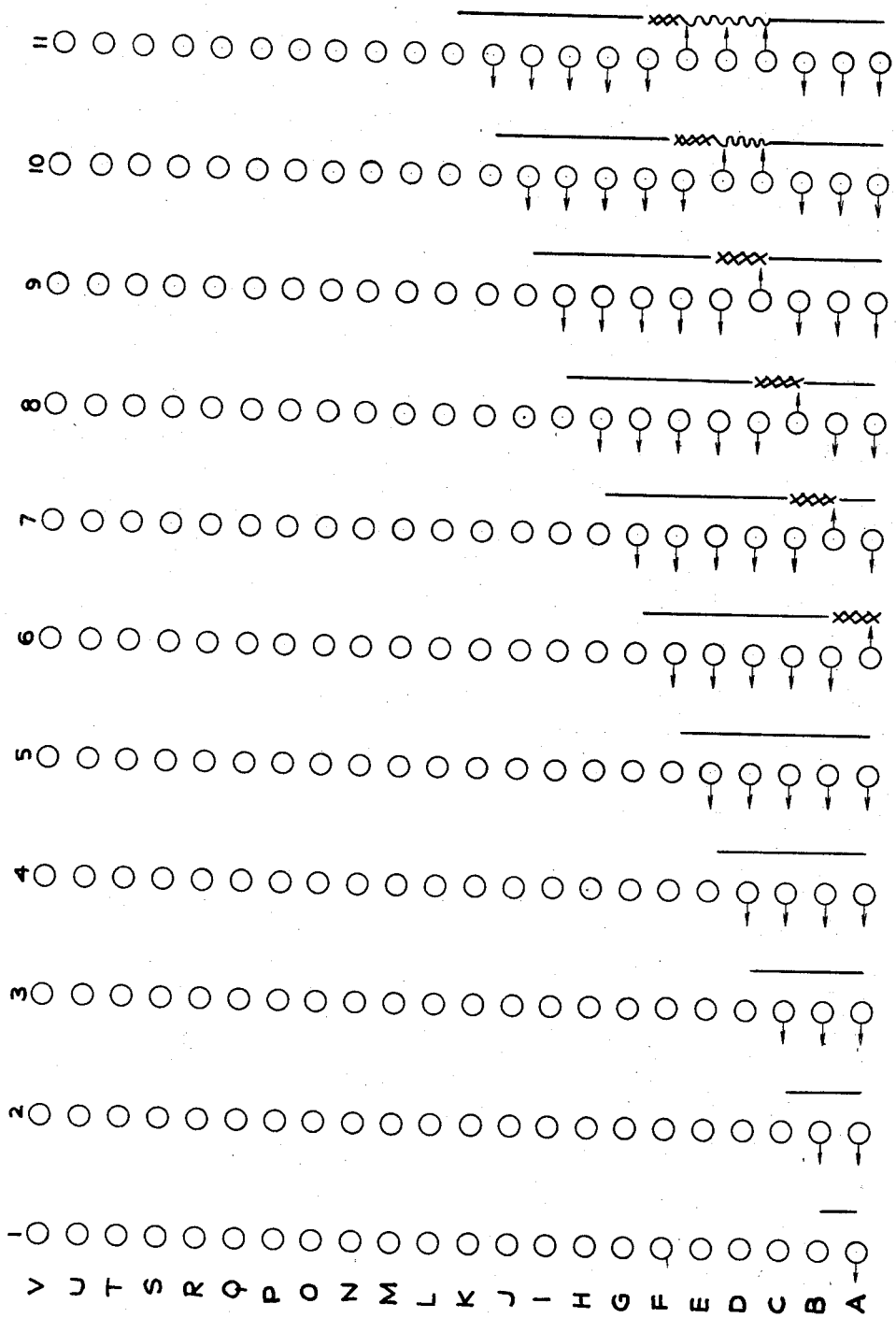

Oct. 3, 1967

F. M. ERNSBERGER  3,345,148
METHOD OF DRAWING A GLASS SHEET, A PORTION OF ITS
SURFACE BEING UNTOUCHED

Original Filed June 27, 1963

SYMBOLS
IMPROVED ═
REGULAR ∿
SCRAP ✕✕✕

INVENTOR.
BY FRED M. ERNSBERGER

Chisholm and Spencer
ATTORNEY

Oct. 3, 1967 F. M. ERNSBERGER 3,345,148
METHOD OF DRAWING A GLASS SHEET, A PORTION OF ITS
SURFACE BEING UNTOUCHED
Original Filed June 27, 1963 4 Sheets-Sheet 4

INVENTOR
FRED M. ERNSBERGER

Chisholm and Spencer

ATTORNEY

United States Patent Office 3,345,148
Patented Oct. 3, 1967

3,345,148
METHOD OF DRAWING A GLASS SHEET, A PORTION OF ITS SURFACE BEING UNTOUCHED
Fred M. Ernsberger, Pittsburgh, Pa., assignor to Pittsburgh Plate Glass Company, Pittsburgh, Pa., a corporation of Pennsylvania
Original application June 27, 1963, Ser. No. 291,174. Divided and this application Feb. 9, 1967, Ser. No. 614,988
2 Claims. (Cl. 65—90)

ABSTRACT OF THE DISCLOSURE

A method of drawing a ribbon of sheet glass by sequentially withdrawing at least one of each successive pair of drawing rolls from the same side of the glass sheet in timed sequence such that at least one side of a portion of the sheet glass ribbon is continuously maintained free of contact with drawing rolls.

*Cross-references to related applications*

This application is a division of application Ser. No. 291,174, filed June 27, 1963, for Sheet Glass.

*Background of the invention*

This invention relates to the manufacture of glass sheet, and specifically to an improved method for drawing a glass ribbon which exhibits an essentially flaw-free surface on at least one side.

The present invention also relates to a high strength glass produced by a process which essentially eliminates strength impairing surface flaws in at least one fire polished surface of a drawn sheet of glass.

In the conventional manufacture of sheet glass, a glass ribbon is vertically drawn from a bath of molten glass through a cooled drawing chamber by means of a drawing machine, which machine includes a plurality of pairs of drawing rolls. The drawing rolls contact the glass surface to apply the tractive force to draw the glass from the molten glass bath through the drawing chamber to the sheet capping or cutting device. These drawing rolls are generally constructed of an asbestos-Portland cement material and extend the width of the glass ribbon. One roll of each pair of drawing rolls is mounted for rotation about a fixed axis, and the other roll of each pair is known as a swing roll, i.e., mounted for rotation about an axis movable toward and away from the glass ribbon. Provision is made in modern drawing machines for uniform rotation of all of the rolls in the machine. The swing roll of each pair of drawing rolls is counterweighted so as to be biased toward the sheet. However, by applying a force to the counterweighted arm the swing roll may be moved to a non-contacting position. Generally the lower or bottom four pairs of rolls of the drawing machine are used for startup of the glass ribbon, and thereafter the swing rolls are moved to the non-contacting position and do not contact the glass ribbon because at their locations the ribbon is easily marked by the rolls.

It has been generally accepted that flat glass produced by present commercial methods will exhibit the characteristics of being strong in compression and weak in tension. Theoretically, however, glass is inherently strong in tension. The low strength of glass in tension is primarily attributed to the presence of minute flaws in the surface of the glass. Visible flaws, i.e., flaws which are optically detectable, can generally be eliminated by visual inspection of the product and routine manipulation of the process or apparatus by which the glass is made. Any glass with such flaws is generally rejected as not of saleable quality.

However, it is also known that there exists in the surface of glass submicroscopic flaws which evade conventional methods of detection. Their existence has been proved mathematically as well as by strength tests and by certain ion exchange techniques. This proof is fully documented in the following published works: A. A. Griffith, Phil. Trans. Roy. Soc., London, Ser. A, vol. 221, p. 163, 1920; F. M. Ernsberger, Proc. Roy. Soc., London, Ser. A, vol. 257, p. 213–223, 1960.

These submicroscopic flaws, i.e., flaws in the order of one micron in length, ½ micron in depth and less than 100 angstrom units in width, or Griffith microcracks, as they are sometimes called, currently are believed to be caused in sheet glass by some form of mechanical microabrasion, as for example, by contact with drawing rolls, handling implements and packing materials. This concept of the mechanical origin of microcracks and a complete resume of a photoresist-lithium ion exchange technique used to substantiate it is now fully set forth in "Advances in Glass Technology," New York, 1962 (Plenum Press), 511, by the present inventor.

*Summary of the invention*

Briefly, the ion exchange method employed in practicing this invention involves the substitution of lithium ions for an equal number of sodium ions. When a glass containing sodium oxide is exposed to a molten salt containing lithium ions, an exchange occurs. Sodium ions diffuse out of the glass into the melt and are replaced by an equal number of lithium ions. Because of the considerably smaller size of the lithium ions (radius ratio lithium$^+$/sodium$^+$=0.63) there is a tendency for the glass structure to shrink. Ordinarily it is prevented from doing so by underlying glass of unaltered composition. The result is a two dimensional hydrostatic state of tensile stress in the surface film of ion exchanged glass.

If microcracks are present in this stressed film, they make themselves evident by serving as origins for the propagation of visible cracks in the film. A Griffith microcrack of the idealized semi-ellipsoidal shape situated in a two dimensionally stressed film must cause a concentration of stress at each end of its major axis. When this stress reaches a critical value, the two ends will propagate in opposite directions and the crack widens. Growth begins only after the treated surface is dipped in water. However, the cracks are too fine to be seen readily and the stressed surface is susceptible of further damage which will cause further cracking. A subsequent etch in aqueous hydrofluoric acid simultaneously widens the crack for better contrast in examination and eliminates the stress condition, preventing the formation of further cracks.

For the purpose of quantitatively measuring the number of microcracks per unit area of glass, the basic ion exchange technique is supplemented by the use of a film of photoresist, i.e., "Kodak Metal-Etch Resist" solution (a product of Eastman Kodak Co., Rochester, N.Y., thought to be an ester of polyvinyl alcohol suitably sensitized and dissolved in an organic solvent) applied to the glass surface to be studied. Suitable patterns of holes are generated in the photoresist film (as will be later explained) and the ion exchange treatment is thereby limited to the areas defined by the holes. The size of the holes is proportioned to the microcrack density in such a way that the number of microcracks in each area is small enough to be readily counted. The result is a statistical sampling of the microcrack population of the surface, with the results expressed in terms of the absolute number of microcracks per unit area.

It is found in the case of commercial plate glass that the microcrack population is very dense, i.e., in the order of tens of thousands of micro-flaws per square centimeter, and the distribution is substantially uniform in any area. Sheet glass, on the other hand, exhibits a microcrack distribution which is variable from sample to sample and non-uniform within a given sample. The microcrack density is normally much less than that of plate glass, i.e., in the order of 3,000 micro-flaws per square centimeter. The irregularity of the distribution strongly suggests that the microcracks in sheet glass originate through random mechanical damage to an originally fire polished flaw-free surface. The drawing rolls contacting the surface of the glass as it is drawn and the mechanical handling of the sheet are probable sources of mechanical damage to the surfaces which result in surface microcracks.

The analytical method set out above provides a convenient tool for quantitatively determining the surface microcrack density of representative pieces of glass. This information can then be compared with the results of strength tests performed on the identical or similar glass to determine the relationship of microcrack density to the strength of glass produced by a particular manufacturing process. As hereinafter set forth, such comparisons have proved that the strength of glass is substantially increased as the surface microcrack density is diminished, with the theoretical maximum strength being obtained as the number of microcracks approaches zero, or a flaw-free surface.

It has been found that by a modified process of operating conventional glass drawing apparatus, it is possible to produce relatively large areas of glass having at least one surface substantially free of mechanical damage, i.e., substantially free from micro-flaws of the nature described which materially reduce the strength of the product. Concurrently, statistical sampling of the glass to determine the flaw condition of the surface by the photoresist-ion exchange method, herein disclosed, makes it possible to establish process controls and continuously produce a substantially uniform product.

*Brief description of the drawings*

These and other features of the invention will become more apparent from the following description when taken with the accompanying drawings in which:

FIGS. 2A and 2B present a schematic representation of a swing roll program for producing 60 inch cap size glass which is essentially free of micro-flaws on one surface.

FIG. 3 is a chart of the symbols employed in FIGS. 2A and 2B, representing the different quality of glass produced.

*Description of the preferred embodiment*

Figure 1:
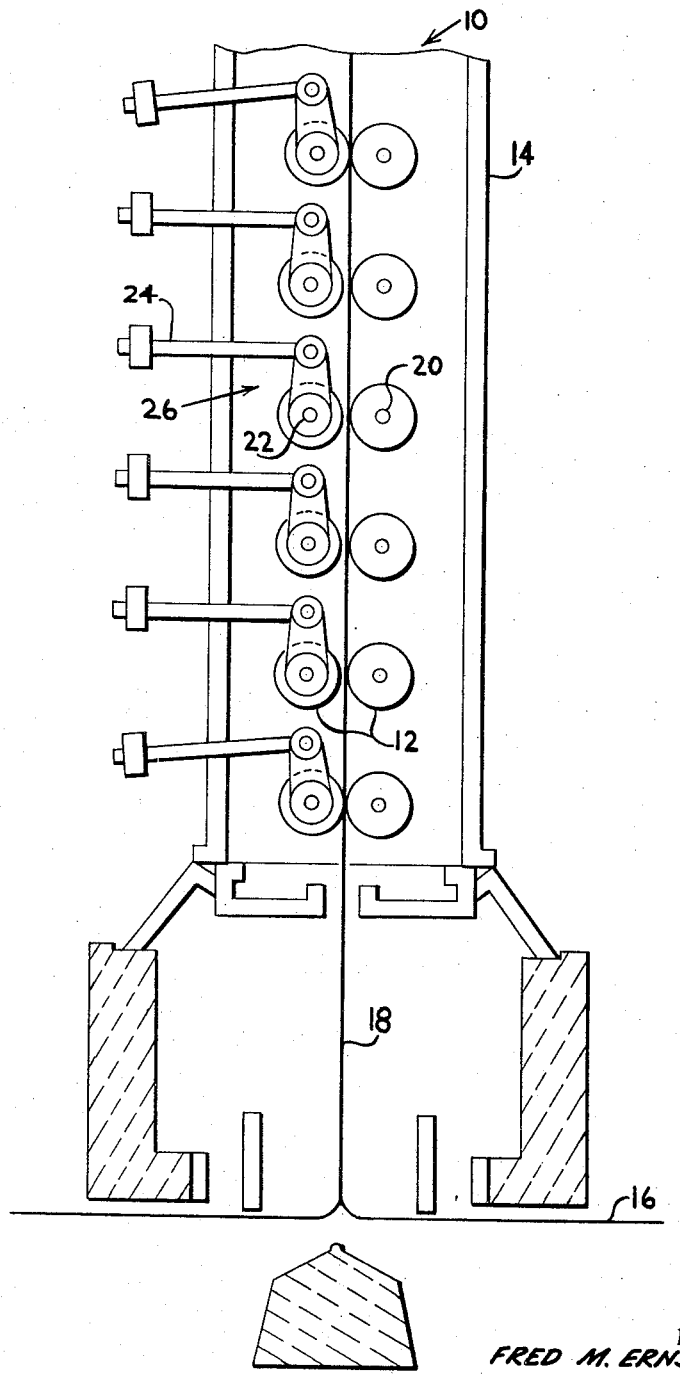
FIG. 1 is a schematic representation of a portion of a typical glass drawing machine showing a series of counterweighted swing rolls opposing corresponding fixed rolls with programming of the rolls being initiated.

One known method of commercially manufacturing sheet glass which is particularly adaptable to the process herein disclosed is generally referred to as the "Pennvernon" or "Pittsburgh" process. The apparatus for performing this process is depicted in FIG. 1, to which reference is made. This process involves the use of the drawing machine 10 employing a number of pairs of rolls 12 arranged in series with a vertical casing 14. Means (not shown) are employed to drive all the rolls at the same speed of rotation. One example of a drive mechanism is described in the United States Letters Patent No. 2,974,447, issued Mar. 14, 1961 to Fred C. Tasher and assigned to the assignee of the present invention. The casing is supported over a bath of molten glass 16 and is open at the top and bottom. In operation, molten glass in the form of a vertically moving ribbon 18 is drawn from the bath of molten metal 16 and is directed between the pairs of rolls 12. The rolls continually draw the ribbon upwardly to a capping station (not shown) located at the top of the casing where the ribbon is cut into into relatively large sheets. The rolls on one side of the sheet are ordinarily mounted in fixed bearings 20, while the rolls on the other side are carried in movable bearings 22 pressed inwardly by weighted levers 24. The latter, usually known as swing rolls 26, provide yielding pressure between the members of each pair of rolls. The ribbon of the initial draw varies considerably in thickness, but after an interval of time during which proper conditions are established within the drawing kiln, the ribbon is substantially uniform in thickness. The manner in mounting the rolls, that is, one fixed and one movable, allows the passages of extreme differences in thickness of glass, such as is caused when the drawing process is started or by improper operation in the drawing of the glass. The swing roll of each pair accommodates the varying thicknesses of glass during the initial draw and also accommodates any variance in thickness as the draw continues. At all times, each pair of rolls rotates at the same speed so as to maintain the drawing speed uniform and also to prevent roll marks on the surface of the ribbon which would occur if the rolls of each pair rotated at different speeds.

The process of the present invention, as applied to Pennvernon and like machines, involves programming the operation of the swing rolls so as to avoid their coming into contact with one surface of the glass sheet. By programming the rolls, it is possible to produce relatively large sheets of glass having one surface substantially free of mechanically induced flaws. To produce sheet glass having an essentially flaw-free surface, it is necessary to first lift a sufficient number of swing rolls 26 from their glass contacting position until the desired length of glass has passed the lowermost roll and then during movement of the glass through the machine, sequentially lift the next succeeding upper swing roll from its normal glass contacting position while lowering the lowermost swing roll to its normal glass contacting position. By repeating this basic operation of simultaneously raising the swing roll preceding the untouched portion of the glass surface while lowering the swing roll immediately following the untouched portion of the glass surface, it is possible for the selected portion of the glass ribbon to traverse the entire drawing machine with one surface never coming into contact with a drawing roll. Obviously, succeeding portions of the glass ribbon may be subjected to like programming and such operation of the machine will generally result in producing glass of varying quality along the length of the ribbon. The quality will generally vary from including a small percentage of scrap in manufacturing the larger cap sizes to the uniform production of glass of alternately regular quality and improved or essentially flaw-free quality in the smaller cap sizes.

The programmed operation of the swing rolls is repeated until the chosen portion of the glass ribbon reaches the cut-off position. There this portion of glass is cut from the ribbon and removed to a rack or the like without mechanical contact with the essentially flaw-free surface. Edge trimming of the glass so removed from the machine can then be accomplished. To protect the essentially flaw-free surface from damage, the glass is sprayed with a stripping lacquer or the like or covered with plastic film and removed for packing, shipping and for ultimate fabrication and use.

Figures 2B, 3:
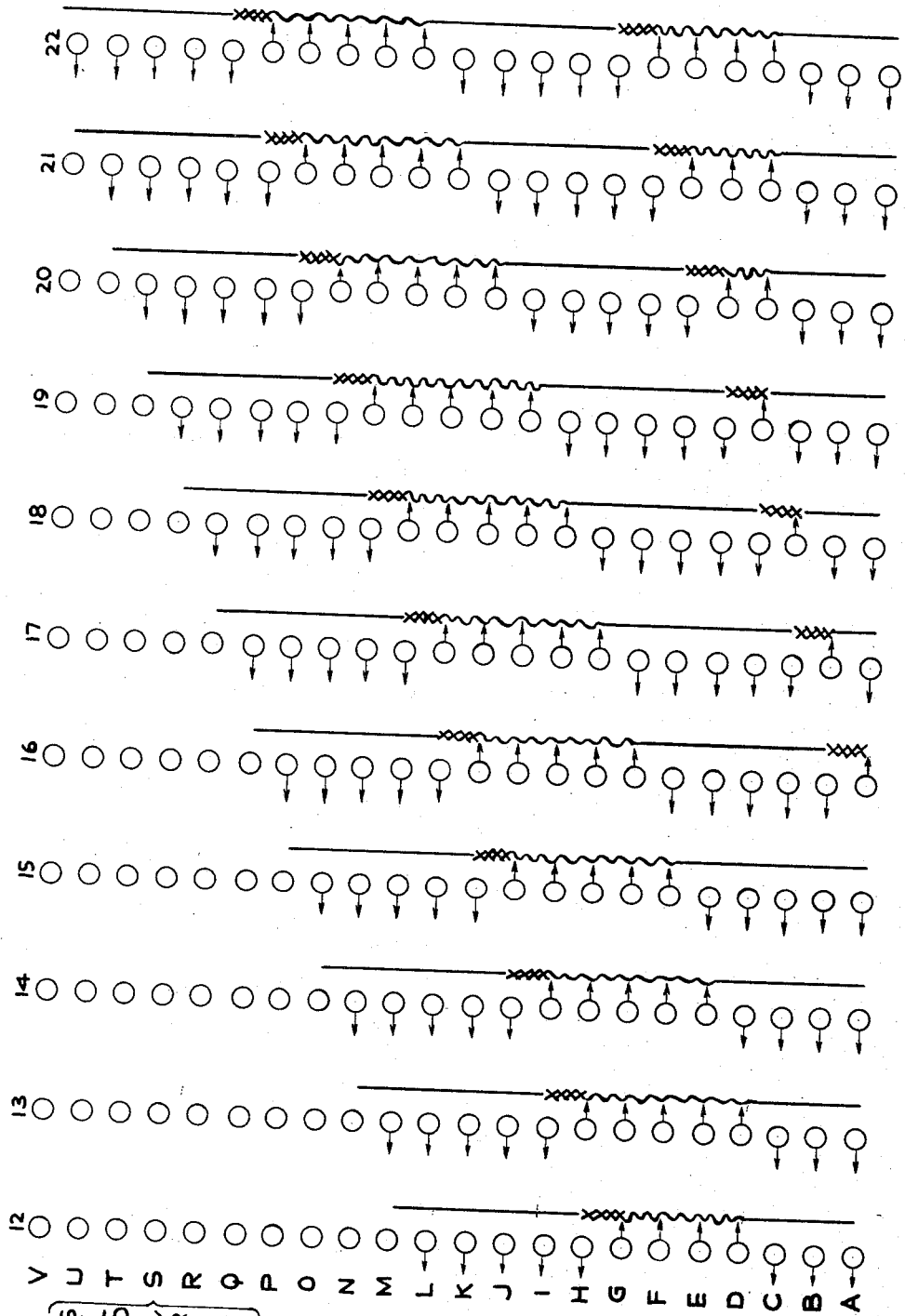
Figure 4:
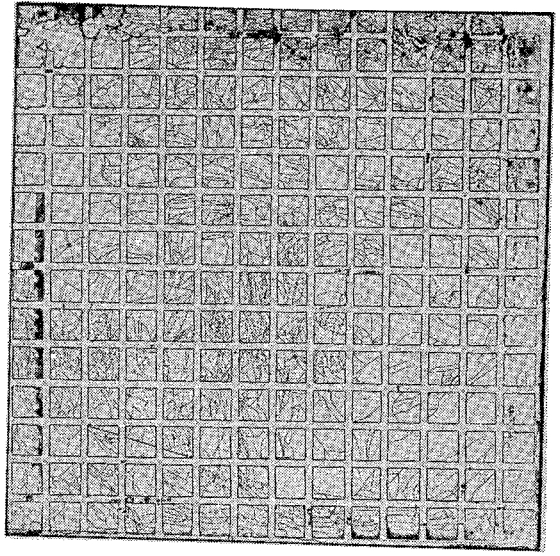
FIG. 4 is an actual photographic representation of the microcrack density made visible by lithium ion exchange in a sheet of regular Pennvernon glass.
Figure 5:
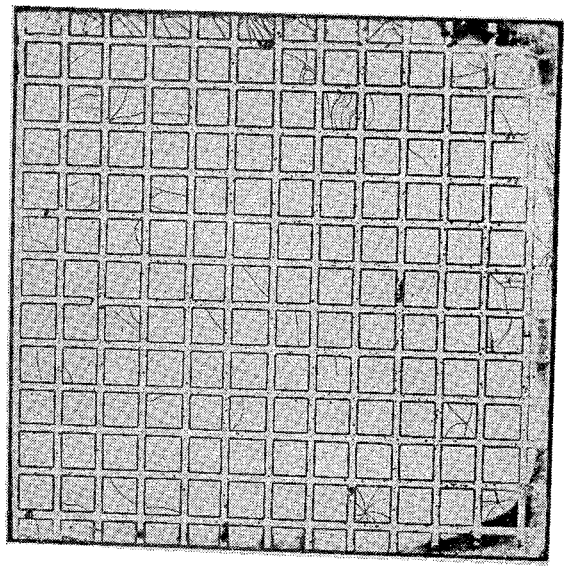
FIG. 5 is an actual photographic representation of the microcrack density made visible by lithium ion exchange in a sheet of glass drawn by the process of this invention.

FIGS. 2A and 2B show a typical roll programming for producing a cap size of 60 inches because the rolls are, in this example, spaced 12 inches apart. Each swing roll is given a letter suffix beginning at the lower roll. Each time interval, showing a new roll sequence, is of equal duration and each interval is numbered consecutively, i.e., 1, 2, 3 etc. A complete description of the programming will follow:

SWING ROLL PROGRAM—60 INCH CAP

| Time Interval | Non-Contacting Swing Rolls (26) | Contacting Swing Rolls (26) |
|---|---|---|
| 1 | A | B-V |
| 2 | A-B | C-V |
| 3 | A-C | D-V |
| 4 | A-D | E-V |
| 5 | A-E | F-V |
| 6 | B-F | A, G-V |
| 7 | A, C-G | B, H-V |
| 8 | A-B, D-H | C, I-V |
| 9 | A-C, E-I | D, J-V |
| 10 | A-C, F-J | D-E, K-V |
| 11 | A-C, G-K | D-F, L-V |
| 12 | A-C, H-L | D-G, M-V |
| 13 | A-C, I-M | D-H, N-V |
| 14 | A-D, J-N | E-I, O-V |
| 15 | A-E, K-O | F-J, P-V |
| 16 | B-F, L-P | A, G-K, Q-V |
| 17 * | A, C-G, M-Q | B, H-L, R-V |
| 18 | A-B, D-H, N-R | C, I-M, S-V |
| 19 | A-C, E-I, O-S | D, J-N, T-V |
| 20 | A-C, F-J, P-T | D-E, K-O, U-V |
| 21 | A-C, G-K, Q-U | D-F, L-P, V |
| 22 | A-C, H-L, R-V | D-G, M-Q |
| 23 | A-C, I-M, S-V | D-H, N-R |
| 24 | A-D, J-N, T-V | E-I, O-S |
| 25 | A-E, K-O, U-V | F-J, P-T |
| 26 | B-F, L-P, V | A, G-K, Q-U |
| 27 * | A, C-G, M-Q | B, H-L, R-V |
| Etc. | (Successive Repetitions of Intervals 18-27) | |

To determine and to some extent control the quality of the glass produced, this invention teaches the use of the ion exchange technique of visually detecting microcracks as modified by the use of a photoresist film. This method works most effectively with glasses containing more than 5 percent sodium, but it has also been found that by prolonging the period of ion exchange, glasses such as the borosilicates can be similarly tested. Following are typical glass compositions which have been tested with the ion exchange-photoresist method of this invention:

| Composition | Sheet (Clear) Percent by Weight | Plate (Clear) Percent by Weight |
|---|---|---|
| $SiO_2$ | 72.94 | 71.43 |
| $Na_2O + K_2O$ | 13.24 | [1] 13.26 |
| CaO | 8.44 | 11.76 |
| MgO | 3.53 | 2.54 |
| $Na_2SO_4$ | 0.42 | 0.75 |
| $Al_2O_3$ | 1.28 | 0.15 |
| $Fe_2O_3$ | 0.09 | 0.11 |
| NaCl | 0.06 | |

[1] If any $K_2O$.

It was mentioned above that each crack visible in the pattern produced by ion exchange corresponds to a pre-existing microcrack. This suggests the possibility of determining microcrack density distributions quantitatively by counting the cracks visible on the treated surface. In practice, this is very difficult and tedious. There is a tendency to count some of the longer cracks twice, and to miss some of the shorter ones altogether. Even more serious is the fact that some of the cracks cross the boundary of the area being counted and there is no way to determine whether they originate within the area or outside it.

These difficulties are avoided if the ion exchange is confined to small areas. If each area of confinement is chosen small enough so that a moderate number of cracks is present (preferably less than 20), then a reliable count can readily be made on a photomicrograph. Furthermore, if these small areas are made identical and arranged in a regular pattern, it is legitimate to say that a statistical sampling of a larger area has been performed.

The use of a photoresist is a convenient method for confining lithium ion exchange to any desired pattern. The surface to be examined is coated with a thin film of the photoresist polymer by the pouring and "whirling" technique used in photoengraving. The film is hardened by baking, then exposed to a carbon arc source behind a suitable mask. The unexposed portions of the photoresist film can then be dissolved away. The coated surface is subsequently exposed to the molten salt bath for the required period. After the sample has been cooled and washed in water, the crack pattern is then "fixed" and made more readily visible by a short etch in 5 percent aqueous hydrofluoric acid.

The typical lithium ion exchange-photoresist technique employed will now be described in further detail.

Initially, the glass sample is cleaned, if necessary, using a clean cotton swab and a suitable solvent such as reagent grade isopropanol. A solution of 1 part "Kodak Metal-Etch Resist" to 2 parts "Kodak Metal-Etch Resist Thinner" is then poured onto the selected surface, wetting the entire surface. The excess solution is drained off while avoiding unnecessary exposure to bright light. While the precise composition of "Kodak Metal-Etch Resist" is not known, it is thought that it is probably an ester of polyvinyl alcohol suitably sensitized and dissolved in an organic solvent. However, it may be stated that any material would do, so long as it is (a) insolubilized by exposure to strong actinic light, and (b) impermeable to lithium ions under the conditions of the following testing procedure. The sample is then spun dry on a whirler coater, which is standard in the photoengraving industry. The object is to produce a thin, uniform film. Other application methods such as dipping or spraying could be adopted. The sample is then subjected to a pre-bake for 10 minutes in an oven at 120° C. This is not a critical operation, since the heating merely drives out the last traces of solvent. The glass sample is then exposed to a 20 ampere arc lamp at 24 inches for approximately 1 minute behind a suitable negative pattern of opaque dots or squares, etc. with the areas between the dots, squares, etc. being transparent to said strong light. The treated surface of the sample is then developed in "Kodak Metal-Etch Resist Developer" for 2 to 3 minutes. This is followed by a post-bake for 10 minutes at 120° C. Again, this bake only serves to drive out the last traces of solvent. The foregoing procedure produces a film of lithium ion-impermeable polymer over the surface exposed to said strong light, viz., surface area between dots or squares.

The prepared sample, which now includes the photoresist film, is preheated in an oven at 250° C. for 10 minutes, preparatory to the subsequent ion exchange treatment. The sample is then floated, treated side down, on a bath of molten $LiNO_3$-$KNO_3$ (60 mole percent $KNO_3$, melting point 130° C.) eutectic contained in a shallow tray for 15 minutes at 250° C. If the sample will not float, it may be coated on the back surface with any impermeable material such as a silicone resin to protect this surface against ion exchange. It should be noted that many variations of the low temperature (i.e., below the glass strain point) ion exchange procedure are possible, in terms of composition of bath, time, and temperature, which will achieve the same results.

The sample is then removed from the salt bath, cooled to room temperature, and the adhering salt residues are rinsed off with water. Cracks develop at this point, but are too fine to be seen readily, and the stressed surface is susceptible to further damage which will cause further cracking. The sample is etched for 2 to 3 minutes in 5 percent aqueous hydrofluoric acid and the "Kodak Metal-Etch Resist" film is then removed by scrubbing. The etch permits removal of the resist and simultaneously widens the cracks for better contrast in examination. The etch also eliminates the stress condition, preventing formation of further cracks. For certain purposes, it may be desirable to continue the etch for as long as 10 minutes, further widening the cracks. The sample is then rinsed and dried and is now ready for examination or photography.

The sample is evaluated by counting the number of cracks in each of a suitable number of areas (exclusive of edge areas which are stressed by cutting the glass), for example, 10 to 100 or more, depending on the statistical certainty required. Mean values referred to unit area and standard deviation from the mean are measures of quality and uniformity, respectively.

A modification of the above procedure, useful especially with glass which is very nearly perfect, e.g., less than 10 flaws per square centimeter, is as follows. The sample is again prepared with a suitable photoresist film and preheated in an oven at 250° C. for 10 minutes preparatory to ion exchange. Then the sample is floated treated side down in a bath of fused $LiNO_3$-$KNO_3$ eutectic contained in a shallow tray, only in this instance for the prolonged period of 8 to 24 hours at 250° C. The sample is then removed from the salt bath, cooled to room temperature and, as before, the adhering salt residues are rinsed off with water. In this procedure, the sample is now evaluated by counting the number of areas which become a translucent white, ignoring those areas which overlap the cut edge of the sample. The ratio of the number of whitened areas to the total number of areas exposed (exclusive of edges) is a measure of the quality of the sample. The uniformity of the sample may be judged by eye. If the whitened areas are scattered randomly over the surface, the sample is uniform. If they are associated in large clusters or in strings, localized damage is indicated.

In the improved process and analytical test method described above, attention has been directed solely to substantially decreasing the number of surface flaws per unit area to increase the tensile strength of one side of the glass sheet. Thus, the question may be raised as to the condition of the other surface which contacts the fixed rolls during drawing and its effect on the ultimate strength of the sheet.

By modification of the improved drawing process of this invention, glass has been produced having two sides which are substantially free of microcracks. However, it must be recognized that double sided substantially flaw-free glass has very limited application. In normal use, one surface of the glass sheet is invariably exposed to an environment which will quickly destroy the essentially flaw-free condition of the surface, e.g., weather, dusty atmosphere, microabrasion, etc. In the absence of applying some form of protective coating, which is often undesirable, the exposed glass surface will soon display a surface microcrack picture which is not unlike that of glass made available by present processes. Thus, this invention has been directed primarily to producing glass having one improved surface and one non-improved surface, which, in application, makes the maximum utilization of the superior characteristics of the improved surface.

It should also be apparent that in applications employing single-sided, substantially flaw-free glass, the improved surface must not only be protected, but also imparts the greatest strength to the glass sheet when it is opposite the side on which the load is applied. Compressional forces applied to the non-improved surface flex the glass, and thus the increased tensional strength of the improved or substantially flaw-free surface manifests itself most effectively.

To summarize the improvements obtained by the presently disclosed process, following are test results which are representative of the increased strength obtainable with one substantially flaw-free surface.

Table I below shows the results of an impact test conducted on a number of glass samples produced by various, identified processes and the microcrack flaw distribution count of these glass samples. The test was conducted by dropping a ½ pound steel ball from various heights onto the center of one surface of a glass sheet or plate supported in an edge clamping frame. The steel ball was dropped from gradually increasing heights until breakage of the glass occurred. The glass was supported in an edge frame in order to give a true indication of the surface strength of the glass unaffected by edge strength. Without edge clamping, the ball drop would be a test of the composite strength of the glass edge and the glass surface with glass failure dependent upon which of the two is weaker. The edge clamping frame used consisted of two aluminum picture-frame-like members between which the sample glass was clamped under low pressure, e.g., in the order of one pound per lineal inch. The edge clamping frame extended inwardly about ½ inch from the peripheral edge of the glass sheet. A thin piece of sponge-like material was interposed between the aluminum frame and the glass to provide uniform distribution of the clamping pressure.

TABLE I.—IMPACT (BALL DROP) TEST

[½ lb. ball—1' x 1' x ⅛" test specimens—all edges clamped]

| Process | Microcracks/Unit Area on Non-Impact Surface, Order of— | Average Drop To Break (ft.) |
|---|---|---|
| Plate, regular | 360,000/sq. in. (both sides) | 3.12 |
| LOF Colburn Sheet | 100,000/sq in. (side #1) | 3. |
| Do | 20,000/10 sq. in. (side #2) | 12.25 |
| Pennvernon Improved Sheet | 20,000/sq. in. (side #1) | 5.17 |
| Do | 10/10 sq. in. (side #2) | 30 |

Table II below shows the results of a loading test on regular glass and improved glass of various thicknesses. In conducting this test, the 4-inch by 4-inch test samples were interposed between and loaded by concentric rings 3 inches and 1½ inches in diameter. The surface placed in tension, i.e., tension side, was adjacent to the 3-inch ring. The loading rate was approximately 1,000 pounds per minute. The thickness of the test samples varied from .065 inch to .225 inch.

TABLE II.—CONCENTRIC RING LOADING

[3" ring and 1.5" ring on 4" x 4" squares]

| Thick (in.) | Pennvernon Regular Sheet [1] Average Break Load (lbs.) | Pennvernon Improved Sheet [2] Average Break Load (lbs.) | Ratio: Improved/ Regular |
|---|---|---|---|
| .222 | 1,776 | 3,877 | 2.2 |
| .185 | 840 | 2,657 | 3.1 |
| .130 | 512 | 3,482 | 6.8 |
| .105 | 347 | 3,186 | 9.2 |
| .090 | 277 | 2,311 | 8.4 |
| .067 | 117 | 1,341 | 11.5 |

[1] Order of 20,000 microcracks/sq. in., both sides.
[2] Order of 20,000 microcracks/sq. in., compression side. Order of 10 microcracks/10 sq. in., tension side.

In amplification of the above test results, it should be noted, in Table I, that a 1-foot by 1-foot by ⅛-inch glass sheet sample produced by the present process, i.e., "improved sheet" in Table I, is at least approximately 2½ times stronger on impact than a comparable sample produced by a presently employed sheet glass process. The improved sheet sample has in the order of 10 microcracks per 10 square inches (exclusive of edge areas affected by cutting), as compared to about 20,000 microcracks per 10 square inches (again, exclusive of edge areas) in the best of the currently available glass tested. Literally, the "improved" glass has only 1/2000 of the microcrack flaw count of the best comparison glass. It can then be said, from the results of the ½ pound drop ball test, that the relation between microcrack flaw count and strength has been fully substantiated.

Table II shows similar substantiating results between glass sheet of different thicknesses. It is theorized that the larger strength ratio for thin sheets is a manifestation of the well-known diaphragm or membrane effect. A brief statement of the diaphragm effect is that in thin plates when the deflection becomes larger than about ½ the thickness, a diaphragm stress enables the plate to carry part of the load as a diaphragm in direct tension. When this condition of large deflection obtains, the plate is stiffer than indicated by the ordinary theory, i.e., Hooke's law, and the load deflection and load stress relations are non-linear. Stresses for a given load are less and stresses for a given deflection are generally greater than the ordinary theory indicates.

As pointed out previously, it must be remembered that many applications of glass strong in tension generally require only one essentially flaw-free surface. This can be appreciated by considering laminates, mutliple glazed units, mirrors and the like, which can be constructed so as to protect and take advantage of the high strength surface of the glass. For example, in a laminated article, i.e., a sandwich composed of two pieces of glass with a plastic interlayer, the essentially flaw-free surfaces are placed adjacent the plastic so as to be protected from damage and also to utilize the increased strength of the glass. Compressive forces applied to the outer surface flex the glass and utilize the increased tensile strength of the essentially flaw-free surface. This is also true in multiple glazed units, wherein the essentially flaw-free surfaces form the inner surfaces of the unit and are thus protected from damage. Utilization of the increased tensile strength is also accomplished here, because compressive forces are applied to the outer glass surfaces.

It is within the contemplation of this invention that the number of microcracks in a substantial portion of at least one fire finished surface of the "improved" glass, as determined by the lithium ion exchange-photoresist technique, will average no more than 100 microcracks per square inch and normally there will be no more than 10 microcracks in any 10 square inch area, exclusive of the peripheral edge areas subjected to cutting damage.

A "photoresist," for the purpose of this invention, includes any light sensitized polymer or the like which becomes impermeable to lithium ions under the conditions set forth for the lithium ion exchange-photoresist method of determining the surface microcrack density of a piece of glass.

Although the present invention has been described with reference to specific details of certain embodiments thereof, it is not intended that such details shall be regarded as limitations upon the scope of the invention except insofar as included in the accompanying claims.

I claim:

1. A method of forming a portion of a continuous ribbon of flat glass having fire-finished surfaces which comprises drawing a continuous ribbon of glass from a molten bath by frictional engagement of both sides of the ribbon with a finite series of pairs of drive rolls disposed at even intervals along the length of the ribbon, disengaging at least one of the pair of drive rolls nearest the molten bath from contact with the ribbon, sequentially withdrawing at least one of each successive pair of drive rolls from the same side of the ribbon previously disengaged in timed sequence as the portion of the ribbon last engaged by both of said pair of drive rolls nearest the molten bath reaches each said successive pair of drive rolls in said series, periodically returning both of said pair of drive rolls nearest the molten bath into engagement with the surface of the ribbon and thereafter sequentially returning both of each successive pair of drive rolls following the drive rolls nearest the molten bath in said timed sequence such that at least one side of a portion of the ribbon is continuously maintained free of contact with at least one roll of each successive pair of rolls in the series.

2. A method of forming a portion of a continuous ribbon of flat glass having fire-finished surfaces which comprises drawing a continuous ribbon of glass from a molten bath by frictional engagement of both sides of the ribbon with a finite series of pairs of drive rolls disposed at even intervals along the length of the ribbon, withdrawing at least one of the pair of drive rolls nearest the molten bath from contact with the ribbon thereby establishing a leading boundary in the direction of draw of a portion of the ribbon untouched on at least one surface, sequentially withdrawing at least one of each successive pair of drive rolls from the same side of the ribbon previously untouched, in timed sequence, as said leading boundary reaches each said successive pair of drive rolls in said series, periodically returning both of said pair of drive rolls nearest the molten bath into engagement with the surface of the ribbon thereby establishing a trailing boundary in the direction of draw of a portion of the ribbon untouched on at least one surface and continuously withdrawing at least one of each successive pair of drive rolls as it is reached by said leading boundary and simultaneously returning both of each successive pair of drive rolls as it is reached by said trailing boundary.

References Cited

UNITED STATES PATENTS 2,972,210   2/1961   Broman et al.   65—95
3,222,156   12/1965   Insolio   65—90

FOREIGN PATENTS 749,107   7/1933   France.

DONALL H. SYLVESTER, *Primary Examiner.*

G. R. MYERS, *Assistant Examiner.*